(12) United States Patent
Lam

(10) Patent No.: US 9,963,165 B2
(45) Date of Patent: May 8, 2018

(54) BALL NUT ASSEMBLY FOR A RACK ELECTRICAL POWER ASSIST STEERING SYSTEM

(71) Applicant: Ford Global Technologies, LLC, Dearborn, MI (US)

(72) Inventor: Anselm Yau-Ching Lam, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 15/275,944

(22) Filed: Sep. 26, 2016

(65) Prior Publication Data

US 2018/0086365 A1 Mar. 29, 2018

(51) Int. Cl.
*B62D 3/08* (2006.01)
*B62D 5/04* (2006.01)
*B62D 3/12* (2006.01)

(52) U.S. Cl.
CPC ........... *B62D 5/0424* (2013.01); *B62D 3/126* (2013.01); *B62D 5/0463* (2013.01)

(58) Field of Classification Search
CPC .. B62D 5/0448; B62D 5/0424; B62D 5/0463; F16H 25/24
USPC ........................................................ 180/444
See application file for complete search history.

(56) References Cited

U.S. PATENT DOCUMENTS

| | | | | |
|---|---|---|---|---|
| 4,593,780 A | * | 6/1986 | Saito | B62D 3/12 180/444 |
| 4,754,829 A | * | 7/1988 | Shimizu | B62D 5/0424 180/446 |
| 6,736,235 B2 | | 5/2004 | Yoshida et al. | |
| 6,868,936 B2 | * | 3/2005 | Shimizu | B62D 5/0424 180/444 |
| 6,880,676 B2 | | 4/2005 | Tsukada et al. | |
| 7,055,646 B2 | | 6/2006 | Bugosh | |
| 7,240,763 B2 | | 7/2007 | Tatewaki et al. | |
| 7,278,334 B2 | * | 10/2007 | Saruwatari | B62D 5/0412 180/444 |
| 9,199,663 B2 | | 12/2015 | Jung et al. | |
| 2003/0192734 A1 | * | 10/2003 | Bugosh | B62D 5/0424 180/444 |
| 2009/0294203 A1 | | 12/2009 | Okada et al. | |
| 2012/0298439 A1 | * | 11/2012 | Ji | B62D 5/0403 180/443 |

\* cited by examiner

*Primary Examiner* — Tony H Winner
(74) *Attorney, Agent, or Firm* — Diederiks & Whitelaw, PLC

(57) ABSTRACT

A ball nut assembly receives rotational motion from a belt and converts rotational motion into linear motion of a steering rack. The ball nut assembly includes a support bearing having an outer race and an inner race, the inner race including one of a spline and a recess. A driven pulley is fixedly coupled to or formed integrally with the inner race. The driven pulley and the inner race rotate in response to movement of the belt. A ball nut includes the other of the spline and the recess, the spline being received in the recess such that rotation of the inner race causes rotation of the ball nut. An elastic material is located in the recess and contacts both the inner race and the ball nut.

20 Claims, 2 Drawing Sheets

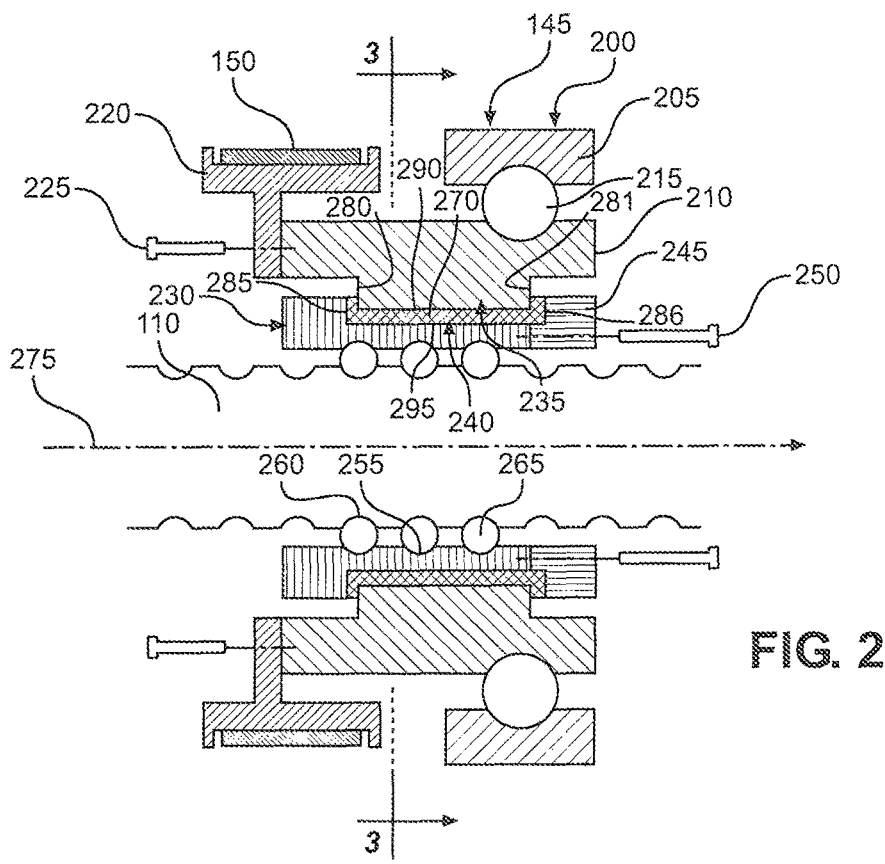
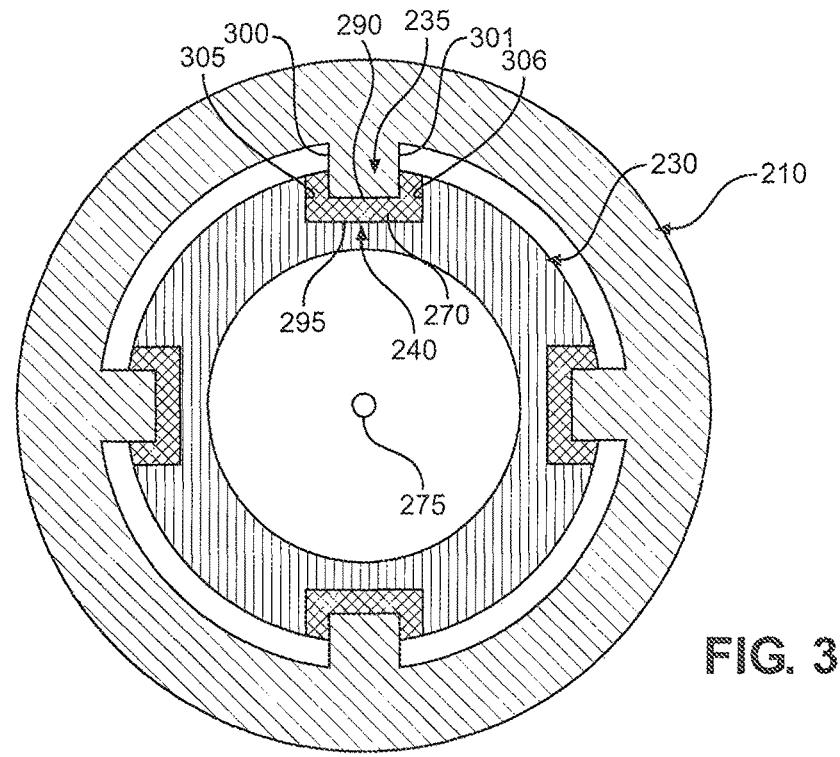
FIG. 2
FIG. 3

BALL NUT ASSEMBLY FOR A RACK ELECTRICAL POWER ASSIST STEERING SYSTEM

BACKGROUND OF THE INVENTION

The present invention pertains to power steering assemblies for motor vehicles and, more particularly, to a ball nut assembly for a rack electrical power assist steering system.

In a typical rack electrical power assist steering system for a motor vehicle, a motor provides assistance to a driver to help steer the motor vehicle. This assistance is generally most beneficial when a large amount of steering input is needed, e.g., when turning the motor vehicle into a parking space. The driver turns a steering wheel that rotates a shaft to move a rack bar connected to the motor vehicle's wheels to steer the motor vehicle. A pulley system, employing a belt, connects the motor to a ball nut assembly that is used to convert a rotational force provided by the motor into a linear force in the rack bar to reduce the effort needed by the driver to steer the motor vehicle. In connection with the present invention, three criteria were established for evaluating potential ball nut assembly designs. First, a driven pulley of the ball nut assembly can have some axial compliance but must have negligible radial compliance in order to maintain belt tension and avoid belt skip. Second, the ball nut assembly must help maintain the motor rotational position relative to the rack bar's linear position, i.e., there must be no rotational slip between the driven pulley and a ball nut of the ball nut assembly. Third, the ball nut should have some compliance axially and radially in order to be robust to tolerance stack-ups and to transfer load efficiently, i.e., there should be no binding in the ball circuit. Current ball nut assembly designs do not meet at least one of the above criteria. In particular, current single bearing ball nut assembly designs only allow for axial compliance and radial lash and are therefore unforgiving of possible tolerance stack-up issues between interacting components. Potential consequences of this include steering noise, vibration and/or feel issues that are generally deemed unacceptable by the driver.

In view of the above, there is a need in the art for a ball nut assembly that meets each of the design criteria set forth above.

SUMMARY OF THE INVENTION

The present invention is directed to a motor vehicle comprising a steering wheel, a steering shaft, a steering rack and a wheel. The motor vehicle is configured so that the steering wheel controls rotation of the steering shaft; rotation of the steering shaft causes linear motion of the steering rack; and linear motion of the steering rack causes the wheel to pivot, thus causing the motor vehicle to change direction. A rack electrical power assist steering system of the motor vehicle includes a motor, a controller configured to control the motor, a belt and a ball nut assembly. The belt is configured to transmit rotational motion from the motor to the ball nut assembly, and the ball nut assembly is configured to convert the rotational motion into linear motion of the steering rack, thus aiding the driver. The ball nut assembly includes a support bearing including an outer race and an inner race, the inner race including one of a spline and a recess. A driven pulley is fixedly coupled to or formed integrally with the inner race, and the belt is wrapped around the driven pulley such that movement of the belt causes rotation of the driven pulley and the inner race. A ball nut includes the other of the spline and the recess, the spline being received in the recess such that rotation of the inner race causes rotation of the ball nut. An elastic material is located in the recess and contacts both the inner race and the ball nut.

In one embodiment, the elastic material is located such that the ball nut is shiftable relative to the inner race in a direction parallel to a longitudinal axis of the steering rack. The spline includes a first axial face and a second axial face, and the recess includes a first axial wall and a second axial wall. The elastic material is located between the first axial face and the first axial wall. The elastic material is also located between the second axial face and the second axial wall. In addition, the elastic material is located such that the ball nut is shiftable relative to the inner race around the longitudinal axis of the steering rack. The spline includes a first rotational face and a second rotational face, and the recess includes a first rotational wall and a second rotational wall. The elastic material is located between the first rotational face and the first rotational wall. The elastic material is also located between the second rotational face and the second rotational wall. Furthermore, the elastic material is located such that the ball nut is shiftable relative to the inner race in a direction perpendicular to the longitudinal axis of the steering rack. The spline includes a radial face, the recess includes a radial wall and the elastic material is located between the radial face and the radial wall.

Preferably the driven pulley has no radial compliance relative to the inner race, and there is no rotational slip between the driven pulley and the ball nut. Also, the ball nut has axial and radial compliance relative to the inner race. Preferably, the driven pulley has no axial compliance relative to the inner race, and the ball nut has rotational compliance relative to the inner race.

Preferably the ball nut assembly is a single bearing-type ball nut assembly. Also, the spline is one of a plurality of splines, and the recess is one of a plurality of recesses. The inner race includes the plurality of splines; the ball nut includes the plurality of recesses. Preferably the elastic material is rubber; however, the elastic material can be any material that provides compliance.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 2 is a cross section of a ball nut assembly of the motor vehicle; and

FIG. 3 is another cross section of the ball nut assembly, showing only a ball nut and a lower race of a support bearing.

DETAILED DESCRIPTION OF THE PREFERRED EMBODIMENTS

Figure 1:
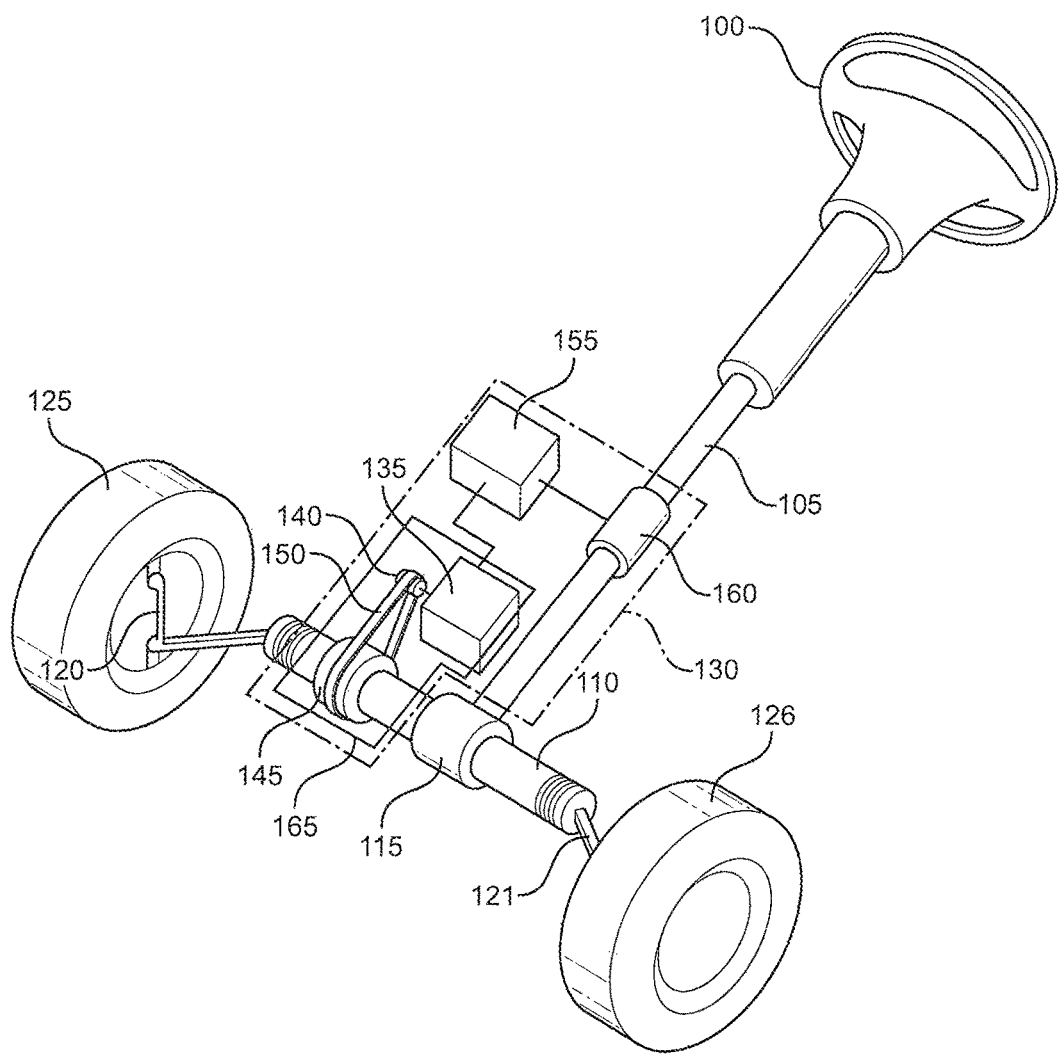
FIG. 1 is a schematic view of a portion of a motor vehicle constructed in accordance with the present invention.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

With initial reference to FIG. 1, there is illustrated a portion of a motor vehicle constructed in accordance with the present invention. The motor vehicle includes a steering wheel 100 located in a passenger compartment (not shown). Steering wheel 100 is connected to and controls rotation of a steering shaft 105. Rotational motion of steering shaft 105 is converted into linear motion of a steering rack 110 through a rack-and-pinion mechanism 115. This linear motion of steering rack 110 causes steering knuckles 120 and 121 to pivot, which, in turn, causes front wheels 125 and 126 connected thereto to pivot. As a result, a driver can use steering wheel 100 to control the degree to which front wheels 125 and 126 are turned, thereby steering the motor vehicle. The motor vehicle also includes a power assist steering system 130 having a motor 135 that causes rotation of a spindle 140. Rotational motion of spindle 140 is transmitted to a ball nut assembly 145 through a belt 150, with ball nut assembly 145 converting this rotational motion into linear motion of steering rack 110, as will be described in more detail below. This linear motion supplements the linear motion caused by steering shaft 105 in order to assist the driver in turning front wheels 125 and 126, i.e., in steering the motor vehicle. The degree of assist is determined by a controller (or control system) 155 of power assist system 130. Specifically, controller 155 receives input from a sensor 160 and uses this input to control motor 135. Sensor 160 is preferably a torque and/or position sensor that measures the torque applied to and/or the rotational position of steering shaft 105. Additionally, power assist system 130 includes a housing 165 in which motor 135, spindle 140, ball nut assembly 145 and belt 150 are located so as to protect these components.

With reference now to FIG. 2, ball nut assembly 145 and steering rack 110 are shown in cross section, with steering rack 110 passing through ball nut assembly 145. Ball nut assembly 145 is a single bearing-type ball nut assembly. In other words, ball nut assembly 145 includes a single support bearing 200, as opposed to a dual bearing arrangement as in some prior art designs. Specifically, support bearing 200 is a ball bearing and includes an outer race 205, an inner race 210 and a plurality of balls (one of which is labeled 215), which are located between and in contact with races 205 and 210. Outer race 205 is fixedly coupled to a portion of the motor vehicle (e.g., housing 165 shown in FIG. 1) to hold outer race 205 in place such that outer race 205 may have some rotation and/or axial compliance but no radial movement, which maintains belt tension. A driven pulley 220 is fixedly coupled to inner race 210 by a plurality of bolts (one of which is labeled 225) to facilitate assembly of ball nut assembly 145. Belt 150 is wrapped around driven pulley 220 such that movement of belt 150 causes rotation of driven pulley 220, with this rotational motion being transmitted to inner race 210. Inner race 210 is connected to a ball nut 230 by a plurality of splines (one of which is labeled 235), which are received in a corresponding plurality of recesses (one of which is labeled 240). Accordingly, rotation of inner race 210 causes rotation of ball nut 230. Ball nut 230 also includes an end cap 245 fixedly coupled to the rest of ball nut 230 by a plurality of bolts (one of which is labeled 250) to facilitate assembly of ball nut assembly 145. In addition, both ball nut 230 and steering rack 110 are threaded. Specifically, ball nut 230 includes an interior thread 255, while steering rack 110 includes an exterior thread 260. A plurality of balls (one of which is labeled 265) is received between threads 255 and 260. As a result of this arrangement, the rotational motion of ball nut 230 is converted into linear motion of steering rack 110.

In summary then, motor 135 causes rotation of spindle 140, and this rotational motion is transmitted to driven pulley 220 by belt 150. Rotation of driven pulley 220 causes rotation of inner race 210, which causes rotation of ball nut 230. Next, the rotational motion of ball nut 230 is converted into linear motion of steering rack 110. This linear motion supplements the linear motion caused by steering shaft 105 in order to assist the driver in steering the motor vehicle, with the degree of assist being determined by controller 155 using input from sensor 160.

In addition to the above, ball nut assembly 145 also includes an elastic material (a portion of which is labeled 270) located between inner race 210 and ball nut 230, with the elastic material located in the recesses. Specifically, the elastic material is placed so as to provide axial, radial and rotational compliance for ball nut 230 relative to inner race 210. By compliance, it is meant the ability of one object (e.g., ball nut 230) to change position relative to another object (e.g., inner race 210) to which it is coupled. Although the following description refers to spline 235, recess 240 and elastic material 270, each spline-recess connection is constructed in the same manner. With respect to axial compliance, elastic material 270 allows ball nut 230 to shift relative to inner race 210 in a direction parallel to a longitudinal axis 275 of steering rack 110 (i.e., leftward and rightward in FIG. 2). This is accomplished by placing elastic material 270 between a first axial face 280 of spline 235 and a first axial wall 285 of ball nut 230. Elastic material 270 is also placed between a second axial face 281 of spline 235 and a second axial wall 286 of ball nut 230. "Axial" walls and faces are defined as those walls and faces aligned such that elastic material located between them provides compliance for ball nut 230 in an axial direction (i.e., in a direction parallel to longitudinal axis 275). With respect to radial compliance, elastic material 270 allows ball nut 230 to shift relative to inner race 210 in a direction perpendicular to longitudinal axis 275 of steering rack 110 (e.g., up and down or into and out of the page in FIG. 2). This is accomplished by placing elastic material 270 between a radial face 290 of spline 235 and a radial wall (or bottom) 295 of recess 240 in ball nut 230. "Radial" walls and faces are defined as those walls and faces aligned such that elastic material located between them provides compliance for ball nut 230 in a radial direction (i.e., in a direction perpendicular to longitudinal axis 275).

With respect to rotational compliance, this is most easily described in connection with FIG. 3, which is a cross section of inner race 210 and ball nut 230 taken along line 3-3 of FIG. 2. Elastic material 270 allows ball nut 230 to shift relative to inner race 210 around longitudinal axis 275 of steering rack 110 (i.e., clockwise and counterclockwise in FIG. 3). This is accomplished by placing elastic material 270 between a first rotational face 300 of spline 235 and a first rotational wall 305 of ball nut 230. Elastic material is also placed between a second rotational face 301 of spline 235 and a second rotational wall 306 of ball nut 230. "Rotational" walls and faces are defined as those walls and faces aligned such that elastic material located between them provides compliance for ball nut 230 in a rotational direction (i.e., in a clockwise or counterclockwise direction around longitudinal axis 275). In total, elastic material 270 is placed between each face 280, 281, 290, 300, 301 of spline 235 and each wall 285, 286, 295, 305, 306 of recess 240, thereby providing axial, radial and rotational compliance for ball nut 230 relative to inner race 210.

As discussed above, three criteria were established for evaluating potential ball nut assembly designs. The first of these criteria is that a driven pulley of the ball nut assembly is allowed to have some axial compliance but must have negligible radial compliance in order to maintain belt tension and avoid belt skip. The second criterion is that the ball nut assembly must help maintain the motor rotational position relative to the rack bar's linear position, i.e., there must be no rotational slip between the driven pulley and a ball nut of the ball nut assembly. The third criterion is that the ball nut should have some compliance axially and radially in order to be robust to tolerance stack-ups and to transfer load efficiently, i.e., there should be no binding in the ball circuit. In contrast to prior art designs, ball nut assembly 145 meets all three of these criteria. With respect to the first criterion, driven pulley 220 is fixed on inner race 210 of support bearing 200 with no radial or axial compliance. With respect to the second criterion, driven pulley 220 is splined to ball nut 230 through inner race 210, creating a true mechanical restriction that prevents rotational slip. This is true even though the elastic material (e.g., elastic material 270) provides rotational compliance, which may result in some torque transfer lag. In other words, the rotational position of motor 135 relative to the linear position of steering rack 110 is maintained even with the inclusion of the elastic material, thereby satisfying the second criterion. With respect to the third criterion, the elastic material provides axial and radial compliance for ball nut 230. While rotational compliance is not explicitly required, the rotational compliance provided by the elastic material allows the radial compliance to function properly.

Although inner race 210 is shown as including four splines in FIG. 3, and ball nut 230 is shown as including four recesses, it should be recognized that other numbers of splines and recesses can be used in connection with the present invention. Furthermore, the splines are not limited to a rectangular cross-section but just need to be shaped and sized to meet the three criteria listed above. Preferably, inner race 210 includes at least 3 splines, with ball nut 230 including a corresponding number of recesses. In addition, the locations of the splines and recesses can be reversed, i.e., ball nut 230 can include the splines and inner race 210 can include the recesses. When inner race 210 includes the recesses, end cap 245 is mounted on inner race 210. The elastic material (e.g., elastic material 270) is preferably rubber, for example, or any other appropriate elastic material that provides the desired compliance. The elastic material is preferably attached to the splines of inner race 210 or the recesses of ball nut 230, with this attachment being made by mold bonding, for example, or any other appropriate process. Also, while certain structure is shown as being made up of multiple pieces (e.g., driven pulley 200 and inner race 210, ball nut 230 and end cap 245 of ball nut 230), these pieces are otherwise formed integrally if assembly requirements allow. For purposes of the present invention, by one object being fixedly coupled to another, it is meant that there is no relative movement between the objects while the objects are coupled to one another. Additionally, the terms "parallel" and "perpendicular" are defined as including a margin of error of +/−5° such that two objects need not be perfectly parallel, for example.

Based on the above, it should be readily apparent that the present invention provides a ball nut assembly that meets each of the desired design criteria. Although described with reference to preferred embodiments, it should be readily understood that various changes or modifications could be made to the invention without departing from the spirit thereof. In general, the invention is only intended to be limited by the scope of the following claims.

The invention claimed is:

1. A power assist system adapted for use in a motor vehicle having a wheel, a steering rack, a steering wheel and a steering shaft configured so that the steering wheel controls rotation of the steering shaft, wherein rotation of the steering shaft causes linear motion of the steering rack, and linear motion of the steering rack causes the wheel to pivot, the power assist system comprising:
   a motor;
   a controller configured to control the motor;
   a belt; and
   a ball nut assembly configured to receive rotational motion from the belt and convert the rotational motion into linear motion of the steering rack, the ball nut assembly comprising: a support bearing including an outer race and an inner race, wherein the inner race includes one of a spline and a recess, a driven pulley fixedly coupled to or formed integrally with the inner race, wherein the driven pulley and the inner race are configured to rotate in response to movement of the belt, a ball nut including the other of the spline and the recess, wherein the spline is received in the recess such that rotation of the inner race causes rotation of the ball nut; and an elastic material located in the recess, wherein the elastic material contacts both the inner race and the ball nut.

2. The power assist system of claim 1, wherein the elastic material is located such that the ball nut is shiftable relative to the inner race in a direction parallel to a longitudinal axis of the steering rack.

3. The power assist system of claim 2, wherein:
   the spline includes a first axial face and a second axial face;
   the recess includes a first axial wall and a second axial wall;
   the elastic material is located between the first axial face and the first axial wall; and
   the elastic material is located between the second axial face and the second axial wall.

4. The power assist system of claim 2, wherein the elastic material is located such that the ball nut is shiftable relative to the inner race around the longitudinal axis of the steering rack.

5. The power assist system of claim 4, wherein:
   the spline includes a first rotational face and a second rotational face;
   the recess includes a first rotational wall and a second rotational wall;
   the elastic material is located between the first rotational face and the first rotational wall; and
   the elastic material is located between the second rotational face and the second rotational wall.

6. The power assist system of claim 4, wherein the elastic material is located such that the ball nut is shiftable relative to the inner race in a direction perpendicular to the longitudinal axis of the steering rack.

7. The power assist system of claim 6, wherein:
   the spline includes a radial face;
   the recess includes a radial wall; and
   the elastic material is located between the radial face and the radial wall.

8. The power assist system of claim 1, wherein:
   the driven pulley has no radial compliance relative to the inner race;

there is no rotational slip between the driven pulley and the ball nut; and the ball nut has axial and radial compliance relative to the inner race.

9. The power assist system of claim 8, wherein:

the driven pulley has no axial compliance relative to the inner race; and the ball nut has rotational compliance relative to the inner race.

10. The power assist system of claim 1, wherein the ball nut assembly is a single bearing-type ball nut assembly, and the ball nut or the inner race has an endcap.

11. The power assist system of claim 10, wherein:

the spline is one of a plurality of splines;

the recess is one of a plurality of recesses;

the inner race includes the plurality of splines; and the ball nut includes the plurality of recesses.

12. The power assist system of claim 10, wherein the elastic material is rubber.

13. A ball nut assembly configured to receive a rotational movement from a belt and convert the rotational motion into a linear motion of a steering rack, the ball nut assembly comprising:

a support bearing including an outer race and an inner race, wherein the inner race includes one of a spline and a recess;

a driven pulley fixedly coupled to or formed integrally with the inner race, wherein the driven pulley and the inner race are configured to rotate in response to movement of the belt;

a ball nut including the other of the spline and the recess, wherein the spline is received in the recess such that rotation of the inner race causes rotation of the ball nut; and an elastic material located in the recess, wherein the elastic material contacts both the inner race and the ball nut.

14. The ball nut assembly of claim 13, wherein the elastic material is located such that the ball nut is shiftable relative to the inner race in a direction parallel to a longitudinal axis of the steering rack.

15. The ball nut assembly of claim 14, wherein:

the spline includes a first axial face and a second axial face;

the recess includes a first axial wall and a second axial wall;

the elastic material is located between the first axial face and the first axial wall; and the elastic material is located between the second axial face and the second axial wall.

16. The ball nut assembly of claim 14, wherein the elastic material is located such that the ball nut is shiftable relative to the inner race around the longitudinal axis of the steering rack.

17. The ball nut assembly of claim 16, wherein:

the spline includes a first rotational face and a second rotational face;

the recess includes a first rotational wall and a second rotational wall;

the elastic material is located between the first rotational face and the first rotational wall; and the elastic material is located between the second rotational face and the second rotational wall.

18. The ball nut assembly of claim 16, wherein the elastic material is located such that the ball nut is shiftable relative to the inner race in a direction perpendicular to the longitudinal axis of the steering rack.

19. The ball nut assembly of claim 18, wherein:

the spline includes a radial face;

the recess includes a radial wall; and the elastic material is located between the radial face and the radial wall.

20. A ball nut assembly of a steering rack, said assembly comprising:

a support bearing including an inner race, wherein the inner race includes a spline;

a ball nut including a recess receiving the spline; and an elastic material, located in the recess, contacting both the inner race and the ball nut, such that the ball nut is shiftable relative to the inner race and parallel to a longitudinal axis of the steering rack.

* * * * *